United States Patent
Matsubara et al.

(10) Patent No.: US 7,146,262 B2
(45) Date of Patent: Dec. 5, 2006

(54) CONTROL APPARATUS AND METHOD FOR VEHICLE

(75) Inventors: Tooru Matsubara, Susono (JP); Yoshio Hasegawa, Chiryuu (JP); Tadayuki Nagai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 75 days.

(21) Appl. No.: 10/874,338

(22) Filed: Jun. 24, 2004

(65) Prior Publication Data
US 2005/0027424 A1 Feb. 3, 2005

(30) Foreign Application Priority Data
Jul. 15, 2003 (JP) ............................. 2003-197108

(51) Int. Cl.
*G06F 17/00* (2006.01)
(52) U.S. Cl. ........................................ 701/51; 477/114
(58) Field of Classification Search .................... None
See application file for complete search history.

(56) References Cited

U.S. PATENT DOCUMENTS

| | | | |
|---|---|---|---|
| 4,803,901 A | 2/1989 | Hamano et al. | |
| 5,542,887 A | 8/1996 | Tsukamoto et al. | |
| 5,704,873 A * | 1/1998 | Iwata et al. | 477/115 |
| 6,023,648 A * | 2/2000 | Murasugi et al. | 701/68 |
| 6,039,673 A * | 3/2000 | Mikami et al. | 477/93 |
| 6,270,443 B1 * | 8/2001 | Ito et al. | 477/114 |
| 6,533,704 B1 * | 3/2003 | Saito et al. | 477/92 |
| 2003/0232696 A1* | 12/2003 | Shibagaki | 477/76 |
| 2004/0044456 A1* | 3/2004 | Tokuda et al. | 701/51 |

FOREIGN PATENT DOCUMENTS

| | | |
|---|---|---|
| DE | 196 03 617 A1 | 8/1996 |
| DE | 197 31 979 A1 | 1/1998 |
| DE | 101 21 187 A1 | 3/2002 |
| JP | 5-118434 | 5/1993 |
| JP | 5-157173 | 6/1993 |
| JP | 11-193732 | 7/1999 |
| JP | 2000-205395 | * 7/2000 |

* cited by examiner

*Primary Examiner*—Michael J. Zanelli
(74) *Attorney, Agent, or Firm*—Oblon, Spivak, McClelland, Maier & Neustadt, P.C.

(57) ABSTRACT

A control apparatus for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied, includes a controller that detects a target idle speed of an engine and determines whether the neutral control can be executed based on the target idle speed.

6 Claims, 12 Drawing Sheets

FIG. 2

|      | C1 | C2 | C3 | C4 | B1 | B2 | B3 | B4 | F0 | F1 | F2 | F3 |
|------|----|----|----|----|----|----|----|----|----|----|----|----|
| P    |    |    |    |    |    |    |    |    |    |    |    |    |
| R    |    |    | ○  |    | ◎  |    |    | ○  |    | ○  |    |    |
| N    |    |    |    |    |    |    |    |    |    |    |    |    |
| 1th  | ○  |    |    | ◎  |    |    |    | ◎  | ○  |    |    | ○  |
| 2nd  | ○  |    |    | ◎  |    | ◎  | ○  |    | ○  | ○  | ○  |    |
| 3rd  | ○  |    | ○  | ◎  | ◎  |    | △  |    | ○  | ○  |    |    |
| 4th  | ○  | ○  | △  | ◎  |    |    | △  |    | ○  |    |    |    |
| 5th  | △  | ○  | ○  |    | ○  |    | △  |    |    |    |    |    |
| 6th  | △  | ○  |    |    | △  | ○  | △  |    |    |    |    |    |

○ ENGAGED
◎ ENGAGED WHEN ENGINE BRAKE IS APPLIED
△ ENGAGED BUT ENGAGEMENT IS NOT RELATED
   TO POWER TRANSMISSION

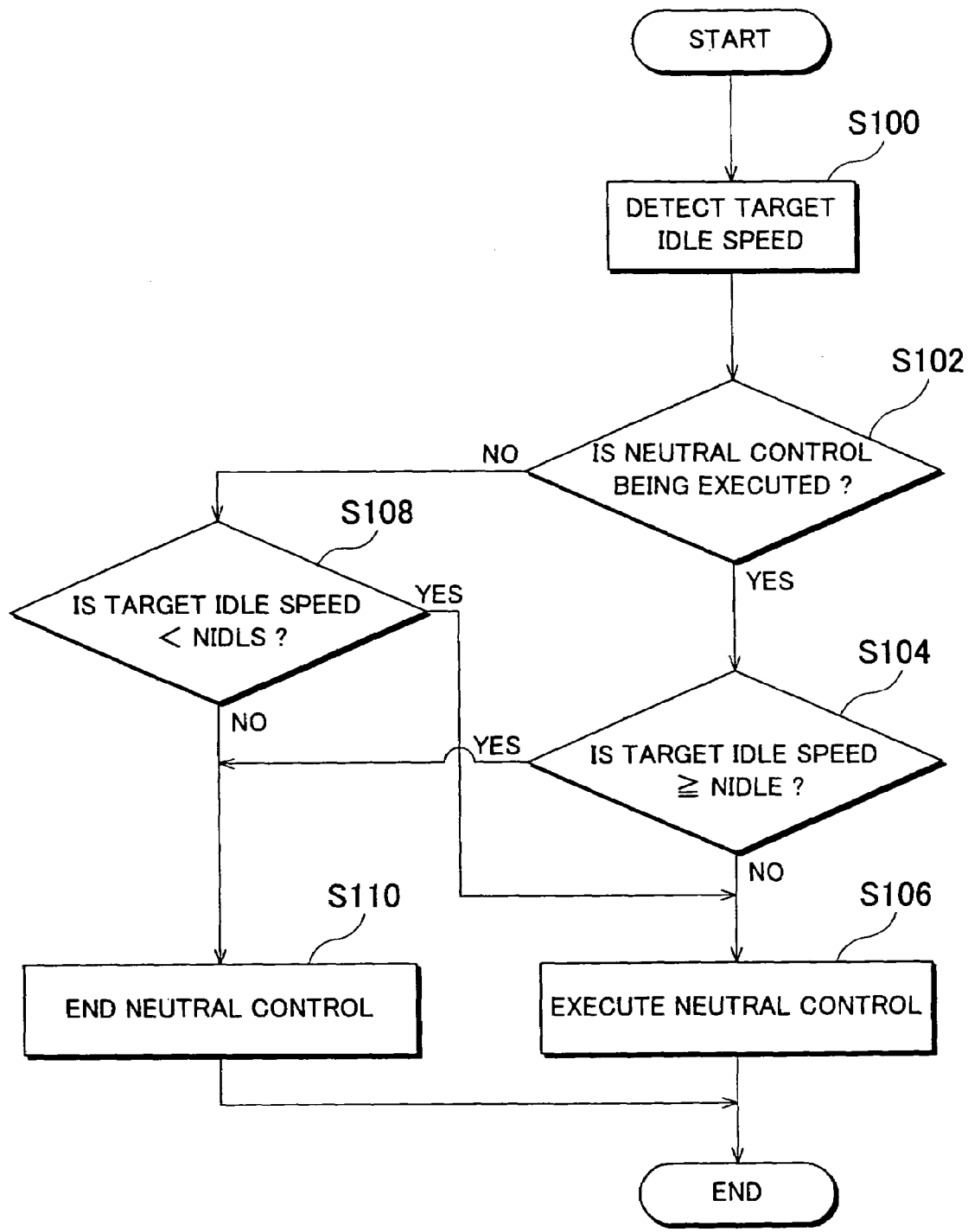

DIFFERENCE = | TURBINE SPEED − TARGET TURBINE SPEED |

—— NEUTRAL CONTROL C1 FEEDBACK CONTROL PROHIBITED
------ NEUTRAL CONTROL C1 FEEDBACK CONTROL NOT PROHIBITED

—— NEUTRAL CONTROL C1 FEEDBACK CONTROL PROHIBITED
------ NEUTRAL CONTROL C1 FEEDBACK CONTROL NOT PROHIBITED

TIME

—— NEUTRAL CONTROL C1 FEEDBACK CONTROL PROHIBITED
------ NEUTRAL CONTROL C1 FEEDBACK CONTROL NOT PROHIBITED

CONTROL APPARATUS AND METHOD FOR VEHICLE

The disclosure of Japanese Patent Application No. 2003-197108 filed on Jul. 15, 2003, including the specification, drawings and abstract is incorporated herein by reference in its entirety.

BACKGROUND OF THE INVENTION

1. Field of the Invention

The invention generally relates to a control apparatus and method for a vehicle equipped with an automatic transmission. More particularly, the invention relates to a control apparatus and method for a vehicle which executes a neutral control.

2. Description of the Related Art

An automatic transmission mounted in a vehicle is connected to an engine via a torque converter or the like provided in the automatic transmission, and includes a gear change mechanism that provides a plurality of power transmission paths. This automatic transmission is structured so as to automatically switch the power transmission path, i.e., the gear ratio (drive speed), based on the accelerator opening amount and the vehicle speed, for example. A vehicle having an automatic transmission is typically provided with a shift lever which is operated by a driver into any one of various shift positions (such as REVERSE, NEUTRAL, DRIVE). Automatic shift control is performed in these shift positions (usually in the drive position or forward-drive range).

When a vehicle having this type of automatic transmission is stopped with the shift lever in a position corresponding to a forward-drive range, such as DRIVE, driving force from the idling engine is transmitted to the transmission via the torque converter and then to the wheels, resulting in a phenomenon known as "creeping." Creeping is extremely useful under certain conditions. For example, it helps to keep a vehicle from slipping backwards when starting from a standstill on an incline so that take-off is smooth. When the driver wants a vehicle that is stationary on a flat road to remain in one spot, however, creeping is unnecessary and must be suppressed by operating the brake. That is, the brake is used to suppress the creeping force from the engine and the fuel efficiency of the engine decreases by a corresponding amount.

To improve fuel efficiency, therefore, it has been proposed to put a transmission that is in the forward-drive range into a neutral state including a semi-neutral state that resembles NEUTRAL while still in the forward-drive range and the vehicle is being held stationary by the brake pedal being depressed so as to operate the brake and the accelerator being almost completely closed. A specific friction apply element of the transmission is released at this time (more precisely, this friction apply element is controlled into a slip state).

Many technologies are known which relate to determining the conditions for allowing and prohibiting the execution of this kind of neutral control, executing neutral control, prohibiting neutral control, and shifting from allowing execution to prohibiting execution (i.e., canceling neutral control).

JP(A) 5-157173 discloses a creep control apparatus for a vehicular automatic transmission, which sufficiently improves fuel efficiency and reduces vehicle vibration during creep prevention control (i.e., neutral control), while reliably preventing engine stall following an increase in engine load when the creep prevention control is cancelled. This creep control apparatus for a vehicular automatic transmission is a creep control apparatus which is designed to prevent creep by placing the transmission in a neutral state, even when the automatic transmission is in the forward-drive range, when predetermined conditions are satisfied. This creep apparatus is provided with the following means: i) means for controlling the idle speed of the engine during creep prevention control to be the same as the idle speed when the creep prevention control is not being executed; ii) means for detecting whether, when the predetermined conditions are not satisfied, the reason for them not being satisfied is because of an intended sudden take-off; and iii) means for canceling the creep prevention control by controlling the hydraulic pressure quickly when the reason for the conditions not being satisfied is an intended sudden take-off, and canceling the creep prevention control by controlling the hydraulic pressure slowly when the reason for the conditions not being satisfied is not an intended sudden take-off.

This creep control apparatus for a vehicular automatic transmission controls the idle speed of the engine during creep prevention control to be the same as the idle speed when the creep prevention control is not being executed. As a result, compared with technology which sets the engine speed higher than necessary, it is possible to reliably reduce vehicle vibrations and improve fuel efficiency, which was the primary object of this creep prevention control. Further, the sound of the engine never changes so there is no annoyance to the driver.

As described above, the creep control apparatus disclosed in JP(A) 5-157173 controls the idle speed of the engine during creep prevention control to be the same as the idle speed when the creep prevention control is not being executed. The creep prevention control (i.e., neutral control), however, is executed based on the idle speed when the creep prevention control is not being executed and the actual engine speed. More specifically, if the actual detected engine speed is even slightly higher than the idle speed (which is the same regardless of whether the creep prevention control is being executed or not), the neutral control (i.e., creep prevention control) is cancelled and neutral control is often not executed again while the vehicle is stopped even if the other conditions for starting the neutral control are satisfied.

The engine speed fluctuates in real time in response to the loads from auxiliary devices driven by the rotational force of the engine. If, as the engine speed fluctuates, it becomes even slightly higher than the set idle speed, the neutral control is cancelled, thus shortening the period during which the neutral control is executed and reducing the fuel efficiency improvement effect.

In order to solve this problem, it is possible to simply increase the idle speed (i.e., the engine speed at which neutral control is allowed). If this is done, then even if the load of an auxiliary device changes, causing the engine speed to rise slightly, the neutral control is continued so as to increase the duration of the neutral control for as long as possible so that the fuel efficiency improvement effect can be achieved. Increasing the idle speed in the manner, however, results in the neutral control being continued while the engine speed is increased. As a result, the input clutch remains in the released state (actually the slip state) while the engine speed is high. The higher the engine speed, the greater the heat generated by the slipping of the input clutch, which is the friction apply element placed in a slip state during execution of the neutral control. This generated heat causes problems such as a reduction in the durability of the input clutch.

Further, during execution of the neutral control, the apply pressure of the input clutch is feedback controlled so that a speed ratio of the torque converter (=turbine speed/engine speed) becomes equal to a target speed ratio. At this time, depending on the state of the feedback control, a large difference may remain between the actual speed ratio and the target speed ratio. As a result, when the engine speed is high, the heat generated by the input clutch slipping increases and causes problems such as a reduction in the durability of the input clutch.

In addition, problems such as a reduction in the durability of the input clutch may also occur if the clutch apply pressure of the input clutch remains high for an extended period of time.

SUMMARY OF THE INVENTION

In view of the foregoing problems, this invention thus provides a control apparatus and method for a vehicle, which executes neutral control while ensuring the durability of an apply element of an automatic transmission.

Accordingly, one aspect of the invention relates to a control apparatus for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied. This control apparatus is provided with a controller that detects a target idle speed of an engine, and determines whether to execute the neutral control based on the target idle speed.

Another aspect of the invention relates to a control method for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied. This control method includes the steps of detecting a target idle speed of an engine, and determining whether to execute the neutral control based on the target idle speed.

According to the control apparatus and method for a vehicle as described above, the determination as to whether to execute the neutral control is made not based on the engine speed, which fluctuates in real time as the load of auxiliary devices changes, but rather based on required torque or the like, e.g., a target idle speed calculated by an ISC (Idle Speed Control system) of an engine ECU (Electronic Control Unit). Because the target idle speed does not change as quickly nor as subtly as the engine speed, it is not necessary to set the engine speed at which the neutral control is allowed high. Accordingly, the apply element will not be kept in a state of slip when the engine speed is high so the amount of heat generated will not increase and the durability of the apply element will not be reduced. In particular, by setting the target idle speed threshold value, which is used to determine that the neutral control can not be executed, to a high speed yet in a range where it will not cause problems with the durability of the apply element, it is possible to extend the neutral control period without reducing the durability of the apply element. It is possible that in this case the actual speed may deviate from the target idle speed, but if it does, that deviation would be eliminated quickly by the feedback control on the idle speed by the ISC so that the durability of the apply element would not be reduced. As a result, a control apparatus for a vehicle can be provided that executes neutral control while ensuring the durability of the apply element.

Yet another aspect of the invention relates to a control apparatus and method for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied. This control apparatus and method i) detects a target idle speed of an engine, ii) detects a speed of the engine, iii) calculates a difference between the engine speed and the target idle speed, and iv) determines whether to execute the neutral control based on the calculated difference.

As described above, this control apparatus and method determines whether to execute the neutral control based on the difference between the engine speed and the target idle speed. When this difference is large, there is a tendency for the engine speed to take more time to reach the target idle speed using the feedback control by the ISC, which may cause problems with respect to the durability of the apply element. Therefore, when the difference is large, it is determined that the neutral control can not be executed so the neutral control is not executed. As a result, a control apparatus for a vehicle can be provided that executes neutral control while ensuring the durability of the apply element. Also, when the difference is large, it is possible that learning control by the ISC has not yet ended. Therefore, when the neutral control is started, the ISC opening is changed in anticipation of a change (i.e., a decrease) in load on the engine. Doing so, however, may result in the change in engine speed being greater than usual, and thus a decrease in drivability. Not executing the neutral control, therefore, enables such a decrease in drivability to be avoided.

Still another aspect of the invention relates to a control apparatus and method for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied. This control apparatus and method i) detects a turbine speed of a torque converter within the automatic transmission, ii) detects a target turbine speed which is a target speed of the turbine speed, iii) calculates a difference between the turbine speed and the target turbine speed, and iv) determines that the neutral control can not be executed when the calculated difference remains equal to, or greater than, a predetermined threshold value for a predetermined period of time or longer.

As described above, this control apparatus and method determines that the neutral control can not be executed when the difference between the turbine speed and the target turbine speed remains equal to, or greater than, a predetermined threshold value for a predetermined period of time or longer. When this difference is large, the apply pressure of the apply element is high. If it remains high for an extended period of time, the durability of the apply element will decrease. In this case, therefore, the neutral control is not executed. As a result, it is possible to execute neutral control while ensuring durability of the apply element. When this difference is large and the turbine speed is lower than the target turbine speed, the apply hydraulic pressure is high so the load on the engine is higher than normal. When the engine speed is low under these conditions, therefore, there is a possibility of engine stall. By not executing the neutral control, however, this possibility is able to be avoided. Further, when the difference is large and the turbine speed is higher than the target turbine speed, on the other hand, the apply hydraulic pressure is low. Therefore, if, under these conditions, the neutral control is being executed and is then cancelled by the accelerator being switched on, there may be a delay in the application of the apply element which may result in a shock being generated. Again, by not executing the neutral control, however, the possibility of such a shock being generated can be avoided.

A further aspect of the invention relates to a control apparatus and method for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied. The control apparatus and method i) performs feedback control on an apply hydraulic pressure of the apply element such that a speed ratio of a torque converter provided in the automatic transmission becomes equal to a predetermined target speed ratio, ii) receives information requesting that the feedback control be prohibited, iii) detects a turbine speed of the torque converter, iv) detects a target turbine speed which is a target speed of the turbine speed, v) calculates a difference between the turbine speed and the target turbine speed, and vi) ignores the information requesting that the feedback control be prohibited that was received during execution of the neutral control and continues the feedback control when the calculated difference is equal to, or greater than, a predetermined threshold value.

According to the foregoing control apparatus and method, even if, for example, this control apparatus is the ECU of the automatic transmission and it receives a request from the engine ECU to prohibit feedback control on the apply hydraulic fluid of the apply element, if the difference between the turbine speed and the target turbine speed is equal to, or greater than, the predetermined threshold value, the information requesting that the feedback control be prohibited is ignored and the feedback control is continued. That is, when the difference between the turbine speed and the target turbine speed is large, the amount of heat generated at the apply element will remain large if feedback control is not performed on the apply pressure of the apply element, based on the request from the engine ECU to prohibit feedback. The increased heat generated under such conditions will ultimately lead to problems with the durability of the apply element. When the difference between the turbine speed and the target turbine speed is large, therefore, the information requesting that the feedback control be prohibited is denied and the feedback control is continued. As a result, neutral control can be executed while ensuring the durability of the apply element.

BRIEF DESCRIPTION OF THE DRAWINGS

The above-mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 2 is a clutch and brake application chart for the automatic transmission shown in FIG. 1;

FIG. 3 is a flowchart showing the control structure of a program executed by an ECU according to the first exemplary embodiment of the invention;

DETAILED DESCRIPTION OF THE PREFERRED EMBODIMENTS

In the following description and the accompanying drawings, the present invention will be described in more detail with reference to exemplary embodiments.

A power train of a vehicle including a control apparatus according to one exemplary embodiment of this invention is as follows. The control apparatus according to this exemplary embodiment is realized by an ECU (Electronic Control Unit) 1000 shown in FIG. 1. The automatic transmission described in this exemplary embodiment is an automatic transmission that is provided with a torque converter, which serves as a fluid coupling, and a planetary gear type gear change mechanism. It should be noted, however, that this invention is not limited to an automatic transmission having a planetary gear type gear change mechanism. That is, the automatic transmission may also be, for example, a continuously variable transmission such as a belt type continuously variable transmission.

Figure 1:
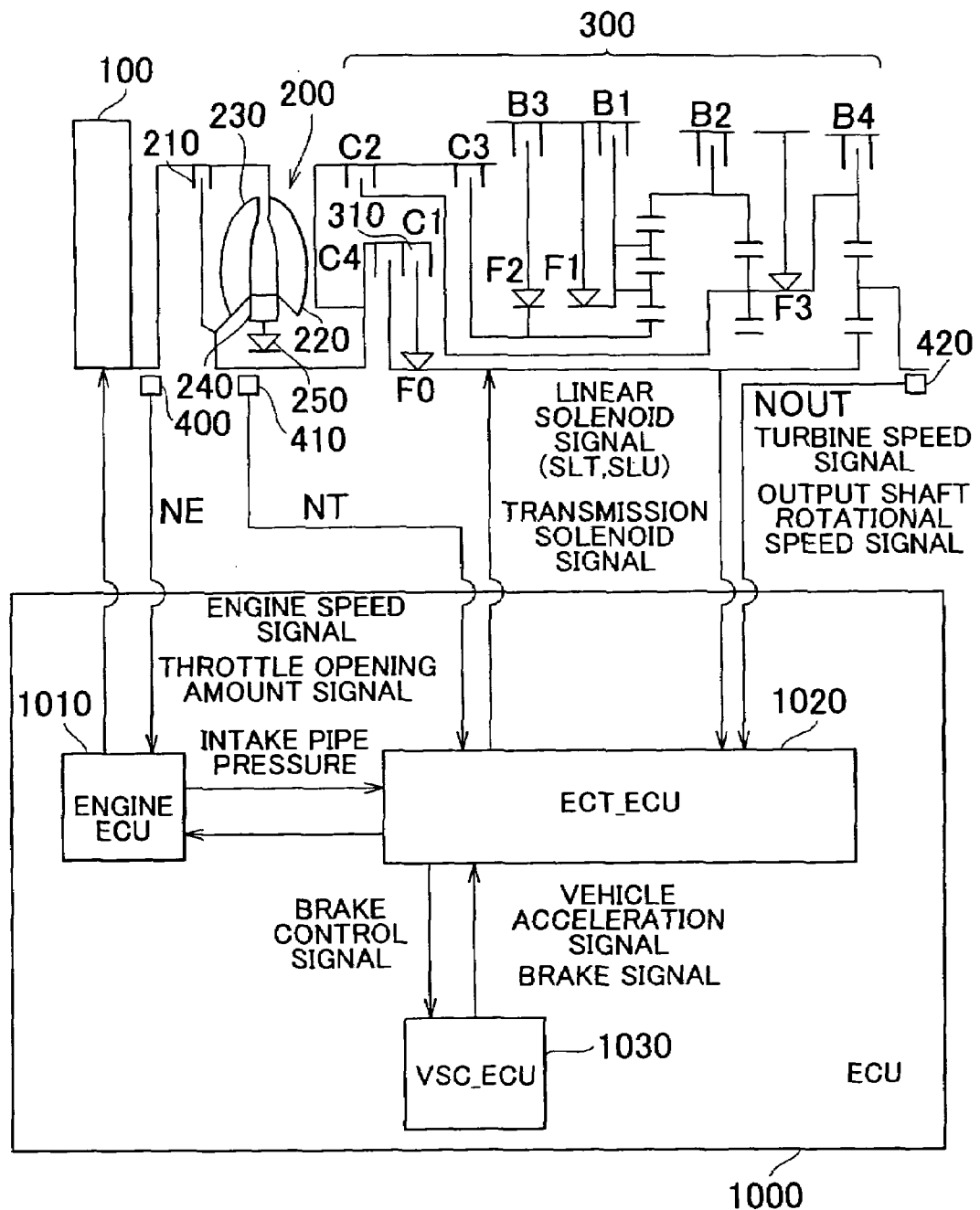
FIG. 1 is a control block diagram of an automatic transmission according to a first exemplary embodiment of the invention.

The power train of a vehicle including a control apparatus according to a first exemplary embodiment of this invention will be described with reference to FIG. 1. The control apparatus according to this exemplary embodiment is more specifically realized by an ECT (Electronically Controlled Automatic Transmission) 1020 shown in FIG. 1.

Referring to the drawing, the power train of the vehicle includes i) an engine 100, ii) an automatic transmission having a torque converter 200 and a planetary gear type gear change mechanism 300, and iii) the ECU 1000.

An output shaft of the engine 100 is connected to an input shaft of the torque converter 200. The engine 100 is coupled to the torque converter 200 via a rotating shaft. Therefore, an input shaft rotational speed (i.e., pump speed) of the torque converter 200 is the same as an output shaft rotational speed NE (i.e., engine speed NE) of the engine 100 detected by an engine speed sensor 400.

The torque converter 200 includes a lockup clutch 210 that locks the input shaft and the output shaft together, a pump impeller 220 on the input shaft side, a turbine runner 230 on the output shaft side, and a stator 240 used to increase torque, which has a one-way clutch 250. The torque converter 200 and the planetary gear type gear change mechanism 300 are connected via a rotating shaft. An output shaft rotational speed NT of the torque converter 200 (i.e., the turbine speed NT) is detected by a turbine speed sensor 410. An output shaft rotational speed NOUT of the planetary gear type gear change mechanism 300 is detected by an output shaft rotational speed sensor 420.

FIG. 2 is a clutch and brake application chart for the planetary gear type gear change mechanism 300. More specifically, this chart shows which of the friction elements, i.e., clutch elements (C1 to C4 in the drawing), brake elements (B1 to B4), and one-way clutch elements (F0 to F3), are applied or released for each speed. In first speed, which is used when the vehicle starts from a standstill, the clutch element (C1) and the one-way clutch elements (F0 and F3) are applied. The clutch element C1, in particular, from among the clutch elements is referred to as an input clutch 310. This input clutch (C1) 310 is also referred to as a forward clutch, and is always applied when the transmission is in a speed to drive the vehicle forward when the shift lever is in a position other than the park (P) position, the reverse (R) position, or the neutral (N) position, as shown in the chart in FIG. 2.

When it has been determined that the shift lever is in the drive (D) position and the vehicle is stopped by predetermined conditions (e.g., the accelerator is off, the brake is on, the brake master cylinder pressure is equal to, or greater than, a predetermined value, and the vehicle speed is equal to, or less than, a predetermined value) being satisfied, so-called neutral control is performed in which the input clutch (C1) 310 is released and put into a predetermined slip state, thereby placing the transmission in a neutral-like state.

The ECU 1000 that controls the power train includes an engine ECU 1010 that controls the engine 100, an ECT (Electronically Controlled Automatic Transmission)_ECU 1020 that controls the planetary gear type gear change mechanism 300, and a VSC (Vehicle Stability Control)_ECU 1030.

The ECT_ECU 1020 receives a signal indicative of the turbine speed NT from the turbine speed sensor 410 and a signal indicative of the output shaft rotational speed NOUT from the output shaft rotational speed sensor 420. The ECT_ECU 1020 also receives a signal indicative of the engine speed NE detected by the engine speed sensor 400 and a signal indicative of a throttle opening amount detected by a throttle position sensor, both of which are output by the engine ECU 1010.

These rotational speed sensors are disposed facing teeth of rotation detecting gears mounted on the input shaft of the torque converter 200, the output shaft of the torque converter 200, and the output shaft of the planetary gear type gear change mechanism 300. These rotational speed sensors are capable of detecting even slight rotation of the input shaft of the torque converter 200, the output shaft of the torque converter 200, and the output shaft of the planetary gear type gear change mechanism 300. These sensors may be sensors which use, for example, magnetic resistance elements, generally referred to as semiconductor sensors.

Further, a signal indicative of the vehicle acceleration detected by a G sensor, as well as a signal indicating whether the brake is on, is output from the VSC_ECU 1030 to the ECT_ECU 1020. The VSC_ECU 1030 inputs a brake control signal from the ECT_ECU 1020 and controls the brakes of the vehicle by controlling the brake hydraulic pressure circuit.

The control structure of a program executed by the control apparatus, i.e., the ECT_ECU 1020, according to this exemplary embodiment will be described with reference to FIG. 3.

In step S100, the ECT_ECU 1020 detects a target idle speed. This target idle speed is detected based on a signal input from the engine ECU 1010 to the ECT_ECU 1020. In step S102, the ECT_ECU 1020 determines whether neutral control is being executed. If the neutral control is being executed (i.e., YES in step S102), the routine proceeds on to step S104. If not (i.e., NO in step S102), the routine proceeds on to step S108.

In step S104, the ECT_ECU 1020 determines whether the target idle speed is equal to, or greater than, a predetermined threshold value NIDLE. If the target idle speed is equal to, or greater than, this predetermined threshold value NIDLE (i.e., YES instep S104), the routine proceeds on to step S110. If not (i.e., NO instep S104), the routine proceeds on to step S106.

In step S106, the ECT_ECU 1020 executes the neutral control. Execution of the neutral control includes continuous execution of the neutral control.

In step S108, the ECT_ECU 1020 determines whether the target idle speed is less than a predetermined threshold value NIDLS. If the target idle speed is less than this predetermined threshold value NIDLS (i.e., YES in step S108), the routine proceeds on to step S106. If not (i.e., NO in step S108), the routine proceeds on to step S110.

In step S110, the ECT_ECU 1020 ends the neutral control. The operation of the neutral control in a vehicle equipped with the ECT_ECU 1020, which relates to the control apparatus according to this exemplary embodiment, will now be described based on the foregoing structure and flowchart.

If the neutral control is not being executed (i.e., NO in step S102) and the detected target idle speed is less than the predetermined threshold value NIDLS (i.e., YES in step S108), the neutral control is executed (step S106). The neutral control starts at this time because the neutral control was not being executed.

If the neutral control is being executed (i.e., YES in step S102) and the detected target idle speed is equal to, or greater than, the predetermined threshold value NIDLE (i.e., YES in step S104), the neutral control is ended (step S110). The process to cancel the neutral control is executed at this time because the neutral control was being executed.

The ECT_ECU 1020, which relates to the control apparatus according to this exemplary embodiment, determines whether to allow execution of the neutral control based on the target idle speed.

Figure 4A:
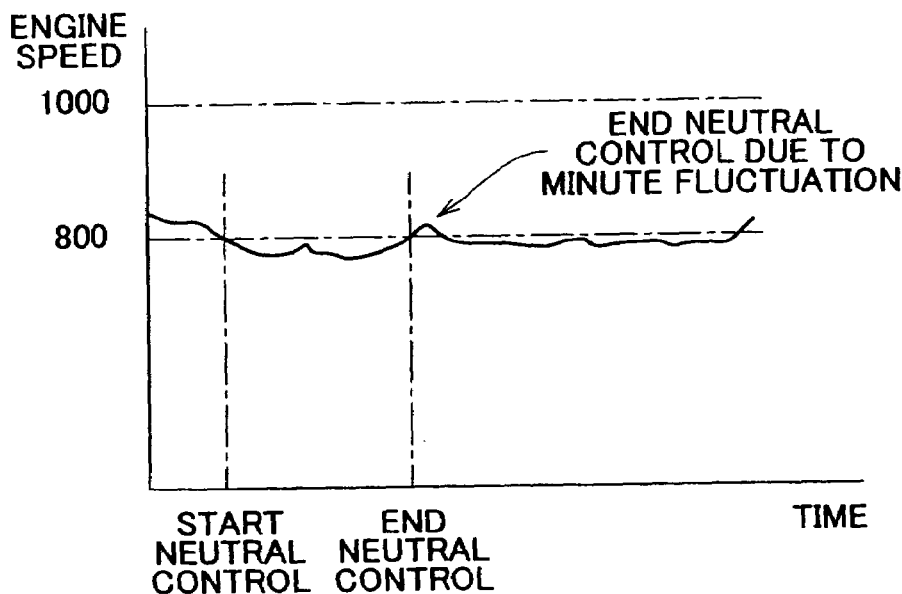
FIGS. 4A, 4B, and 4C are timing charts showing operation of a vehicle equipped with an automatic transmission according to the first exemplary embodiment of the invention.
Figure 4B:
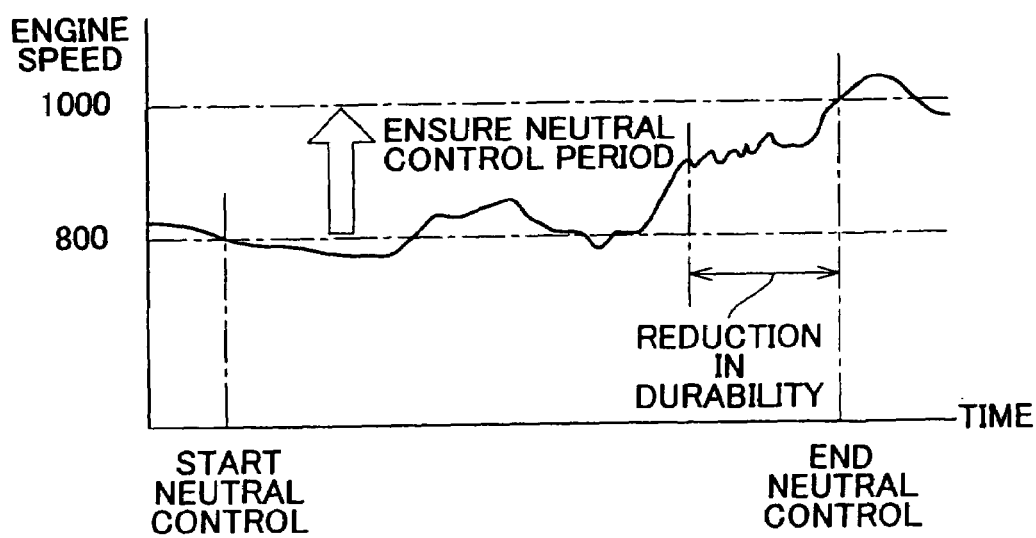

Referring to FIGS. 4A and 4B, with conventional technology, the threshold value for the engine speed is set in advance and the neutral control is ended when the detected engine speed becomes equal to, or greater than, that threshold value. In the example in FIG. 4A, the neutral control is set to end when the engine speed becomes equal to, or greater than, 800 rpm. Thus, the neutral control starts when the engine speed is below 800 rpm. If, however, due to a change in the load of an auxiliary device driven by the rotational force of the engine, for example, the engine speed changes even minutely such that it even slightly exceeds 800 rpm, the neutral control is ended at that point. As a result, the duration during which the neutral control is executed is shortened.

In the example in FIG. 4B, on the other hand, the threshold value of the engine speed to ensure the duration of the neutral control is set in a high region, such as 1000 rpm. Thus, after the neutral control starts, it continues to be executed until the engine speed exceeds the threshold value of 1000 rpm. The engine speed at this time is high in the region above 800 rpm and equal to, or less than, 1000 rpm, which leads to a reduction in the durability of the input clutch (C1) 310, as shown in FIG. 4B.

That is, setting the threshold value for the engine speed low, as is shown in FIG. 4A, may shorten the duration of the neutral control by the neutral control ending due to a slight change when the engine speed changes in real time. On the other hand, setting the threshold value for the engine speed high, as is shown in FIG. 4B, may reduce the durability of the input clutch (C1) 310 due to the high engine speed.

Figure 4C:
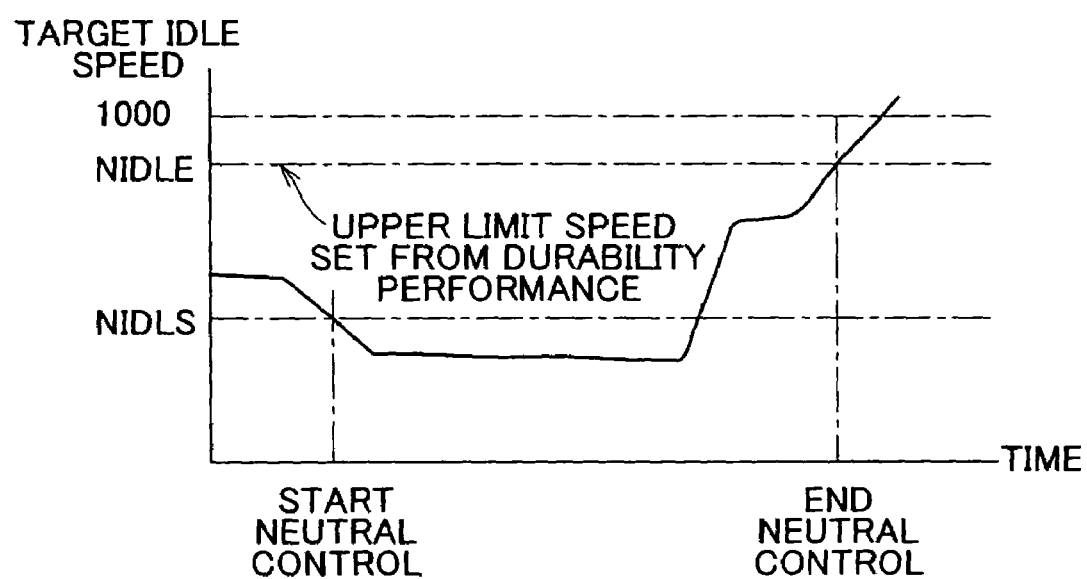

The ECT_ECU 1020, which relates to the control apparatus according to this exemplary embodiment, sets two threshold values for the target idle speed: a first threshold value NIDLS and a second threshold value NIDLE, as shown in FIG. 4C. If the target idle speed falls below the predetermined first threshold value NIDLS (i.e., YES in step S108), the neutral control is executed (step S106). If the target idle speed becomes equal to, or greater than, the predetermined second threshold value NIDLE (i.e., YES in step S104), the neutral control is ended (step S110).

By making this second threshold value NIDLE the upper limit speed set based on the durability performance of the input clutch (C1) 310, it is possible to ensure a long period during which the neutral control is executed while maintaining the durability of the input clutch (C1) 310 and thus achieve the fuel efficiency improvement effect.

Accordingly, the neutral control executed by the ECT_ECU 1020, which relates to the control apparatus according to this exemplary embodiment, is able to extend the period of time during which the neutral control is executed, while avoiding a reduction in the durability in the input clutch C1.

A control apparatus according to a second exemplary embodiment of the invention is as follows. The hardware structure in this exemplary embodiment is the same as that in the first exemplary embodiment. Therefore, a detailed description thereof will not be repeated. More specifically, the hardware structure in the second exemplary embodiment is the same as that in the first exemplary embodiment (FIGS. 1 and 2).

Figure 5:
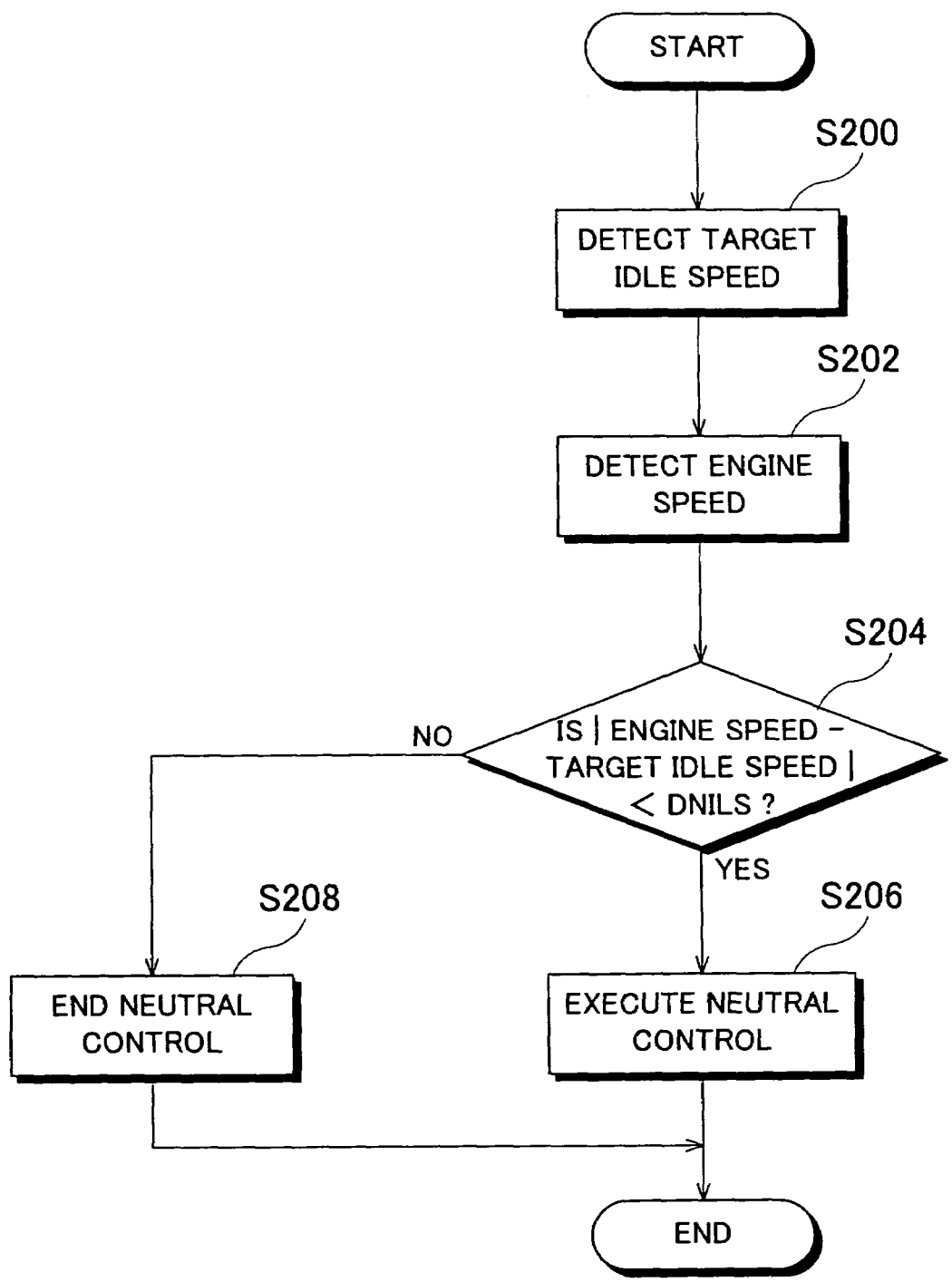
FIG. 5 is a flowchart showing the control structure of a program executed by an ECU according to a second exemplary embodiment of the invention.

The control structure of a program executed by the ECT_ECU 1020 according to this exemplary embodiment will be described with reference to FIG. 5.

In step S200, the ECT_ECU 1020 detects the target idle speed. In step S202, the ECT_ECU 1020 detects the engine speed. The processes in steps S200 and S202 are performed based on information received from the engine ECU 1010 by the ECT_ECU 1020.

In step S204, the ECT_ECU 1020 determines whether |engine speed—target idle speed| is less than a predetermined threshold value DNILS. If |engine speed—target idle speed| is less than this predetermined threshold value DNILS (i.e., YES in step S204), the routine proceeds on to step S206. If not (i.e., NO in step S204), the routine proceeds on to step S208.

In step S206, the ECT_ECU 1020 executes the neutral control. If the neutral control is being executed at this time, it is simply continued. If the neutral control is not being executed at this time, it is started.

In step S208, the ECT_ECU 1020 ends the neutral control. If the neutral control is being executed at this time, the cancellation process to cancel the neutral control is executed. If the neutral control is not being executed at this time, this state is maintained, i.e., the neutral control is not executed.

Operation of the neutral control in a vehicle equipped with the ECT_ECU 1020, which relates to the control apparatus according to this exemplary embodiment, will now be described based on the foregoing structure and flowchart.

The target idle speed is detected (step S200), the engine speed is detected (step S202), and the difference, expressed by |engine speed—target idle speed |, is calculated. If this difference is less than the predetermined threshold value DNILS (i.e., YES in step S204), the neutral control is started or continued (step S206). If, on the other hand, that difference is equal to, or greater than, the threshold value DNILS (i.e., NO in step S204), the neutral control is not executed or is canceled (step S208).

Figure 6:
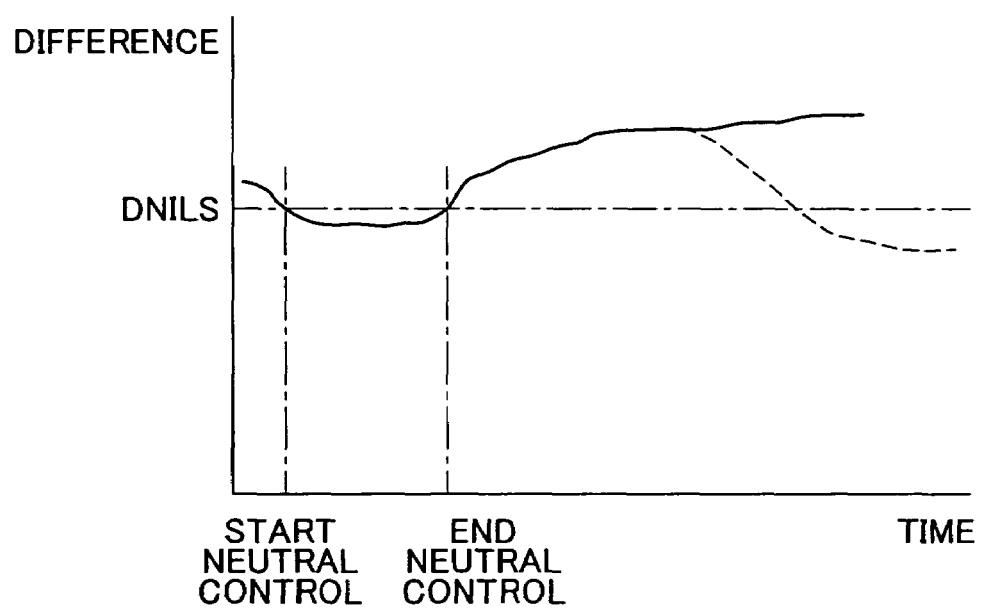
FIG. 6 is a timing chart showing operation of a vehicle equipped with an automatic transmission according to the second exemplary embodiment of the invention.

The progression over time at this time will now be described with reference to FIG. 6. FIG. 6 shows the change over time in the difference. If the difference (|engine speed—target idle speed|) is less than the predetermined threshold DNILS (i.e., YES in step S204), the neutral control is started. If for some reason the difference has increased and is equal to, or greater than, the predetermined threshold DNILS (i.e., NO in step S204), the neutral control is ended by executing cancellation control to cancel the neutral control (step S208).

In this case, the difference is large and it tends to take more time for the engine speed to reach the target idle speed by the feedback control with the ISC, as shown by the solid line in FIG. 6. Even if the engine speed does reach the target idle speed, it takes so long to do so, as shown by the broken line in FIG. 6, that if the neutral control were to be executed in this state, problems would occur with the durability of the input clutch (C1) 310 during that time.

As described above, the ECT_ECU 1020, which relates to the control apparatus according to this exemplary embodiment, determines whether to execute the neutral control based on the difference between the engine speed and the target idle speed. When this difference is large, the ECT_ECU 1020 determines that the neutral control can not be executed because executing the neutral control at this time would cause problems with the durability of the input clutch C1 due to the tendency of the engine speed to take more time to reach the target idle speed. Therefore, it is possible to provide a control apparatus for a vehicle that executes neutral control while ensuring the durability of the input clutch.

A control apparatus according to a third exemplary embodiment of the invention is as follows. Just as in the second exemplary embodiment, the hardware structure in the third exemplary embodiment is the same as that in the first exemplary embodiment (FIGS. 1 and 2). Therefore, a detailed description thereof will not be repeated.

Figure 7:
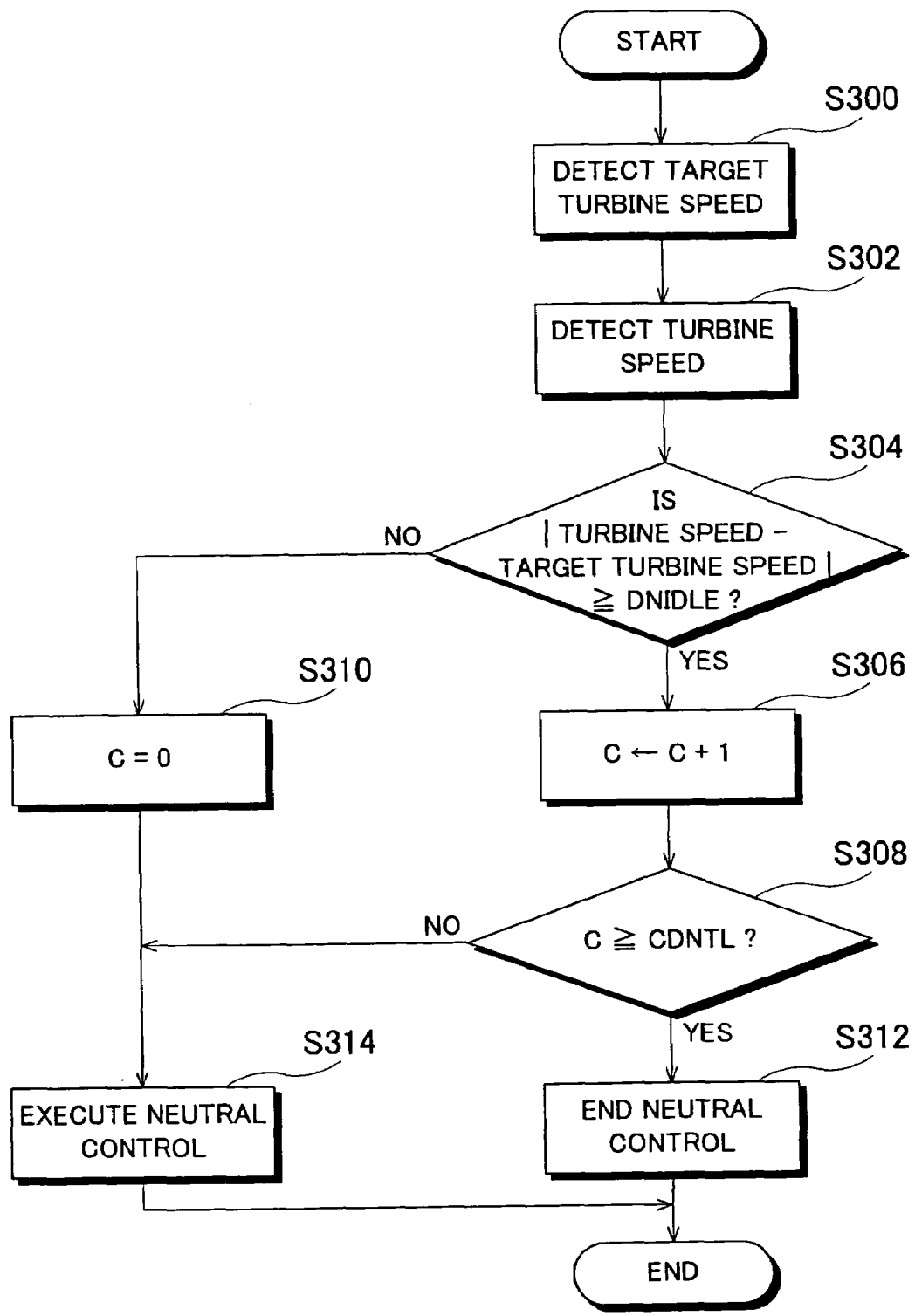
FIG. 7 is a flowchart showing the control structure of a program executed by an ECU according to a third exemplary embodiment of the invention.

The control structure of a program executed by the ECT_ECU 1020 according to this exemplary embodiment will be described with reference to FIG. 7.

In step S300, the ECT_ECU 1020 detects a target turbine speed. In step S302, the ECT_ECU 1020 determines the turbine speed. In step S304, the ECT_ECU 1020 determines whether |turbine speed—target turbine speed| is equal to, or greater than, a predetermined threshold value DNIDLE. If

|turbine speed—target turbine speed| is equal to, or greater than, the predetermined threshold value DNIDLE (i.e., YES in step S304), the routine proceeds on to step S306. If not (i.e., NO in step S304), the routine proceeds on to step S310.

In step S306, the ECT_ECU 1020 adds 1 to a counter value C. In step S308, the ECT_ECU 1020 determines whether the counter value C is equal to, or greater than, a predetermined threshold value CDNTL. If the counter value C is equal to, or greater than, the predetermined threshold value CDNTL (i.e., YES in step S308), the routine proceeds on to step S312. If not (i.e., NO in step S308), the routine proceeds on to step S314.

In step S310, the ECT_ECU 1020 initializes the counter value C (C=0).

In step S312, the ECT_ECU 1020 ends the neutral control. If the neutral control is being executed at this time, cancellation control is executed to cancel the neutral control. If the neutral control is not being executed at this time, this state is maintained, i.e., the neutral control is not executed.

In step S314, the ECT_ECU 1020 executes the neutral control. If the neutral control is not being executed at this time, it is started. If the neutral control is being executed at this time, it is simply continued.

If the cycle time of the program illustrated in the flowchart is, for example, 100 msec, then after 10 cycles (i.e., C=10), 1.0 second will have passed. Thus it may be said that the counter value C is a measure of time.

Operation of the neutral control in a vehicle equipped with the ECT_ECU 1020, which relates to the control apparatus according to this exemplary embodiment, will now be described based on the foregoing structure and flowchart.

Figure 8A:
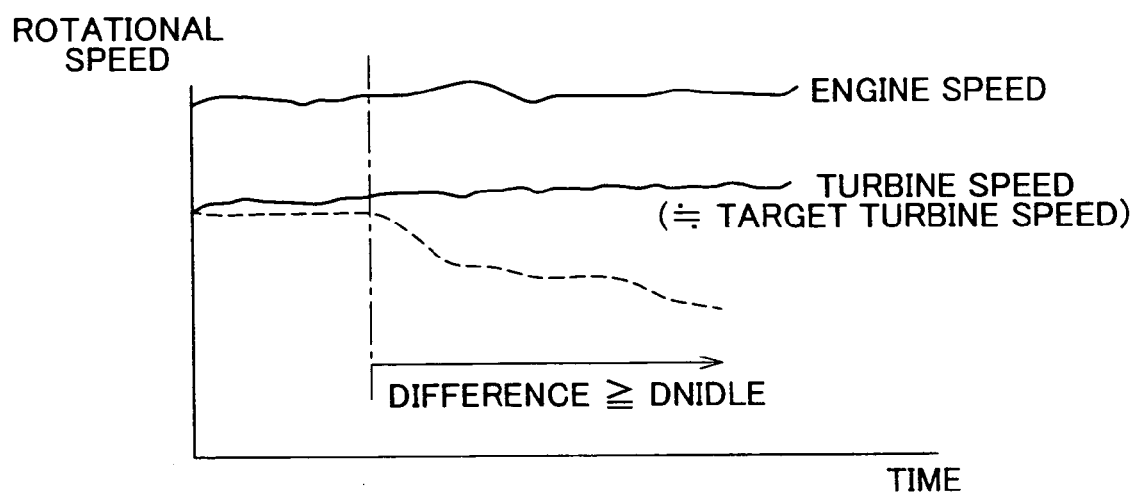
FIGS. 8A and 8B are timing charts showing operation of a vehicle equipped with an automatic transmission according to the third exemplary embodiment of the invention.

Referring to FIG. 8A, the solid line indicates the turbine speed when ordinary control is being executed. The broken line indicates the turbine speed in a case where it deviates greatly from the target turbine speed for some reason. In the region to the right of the vertical alternating short-long dash line, the region being specified by the arrow in the drawing, the difference between the turbine speeds (i.e., between the solid line and the broken line) is equal to, or greater than, a predetermined threshold value DNIDLE.

Figure 8B:
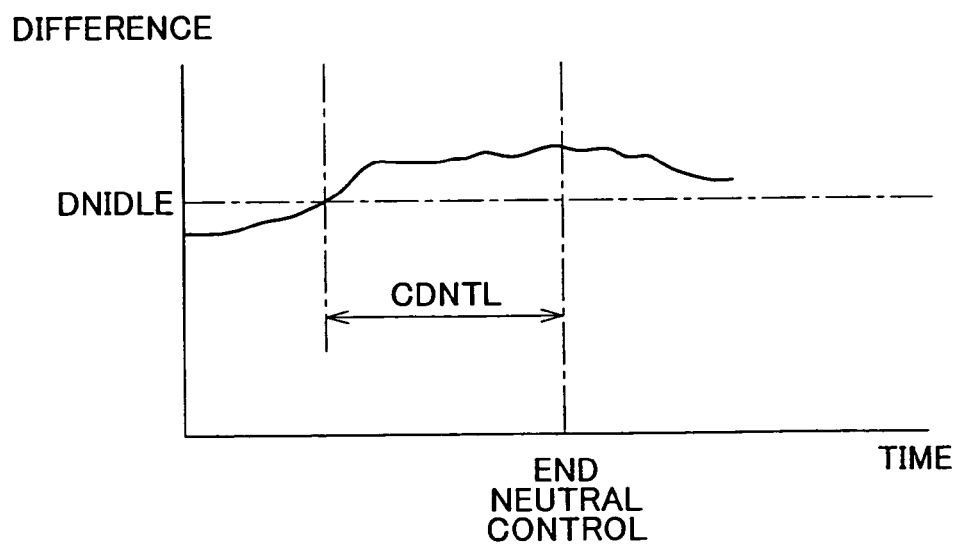

The time during which this difference is equal to, or greater than, the predetermined threshold value DNIDLE is counted, as shown in FIG. 8A. The neutral control is ended when this counter value C becomes equal to, or greater than, a predetermined threshold value CDNTL, as shown in FIG. 8B. That is, when the difference between the turbine speed and the target turbine speed continues to be equal to, or greater than, the predetermined threshold value (DNIDLE) and the counter value C indicative of the duration over which that difference exists is equal to, or greater than, the predetermined period of time (CDNTL), it is determined that the neutral control can not be executed.

When that difference is large, for example, the apply pressure of the apply element is high. If this apply pressure were to remain high for an extended period of time, a reduction in the durability of the apply element would result, so the neutral control is not executed in this case.

As described above, the ECT_ECU 1020, which relates to the control apparatus according to the exemplary embodiment, ends the neutral control if the difference between the turbine speed and the target turbine speed remains greater than the predetermined threshold value for longer than a predetermined period of time. It is therefore possible to avoid the apply pressure of the input clutch remaining high for an extended period of time when the difference is large, and thus avoid a reduction in the durability of the input clutch C1.

A control apparatus according to a fourth exemplary embodiment of the invention is as follows. Just as in the second and third exemplary embodiments, the hardware structure in the fourth exemplary embodiment is the same as that in the first exemplary embodiment (FIGS. 1 and 2). Therefore, a detailed description thereof will not be repeated.

Figure 9:
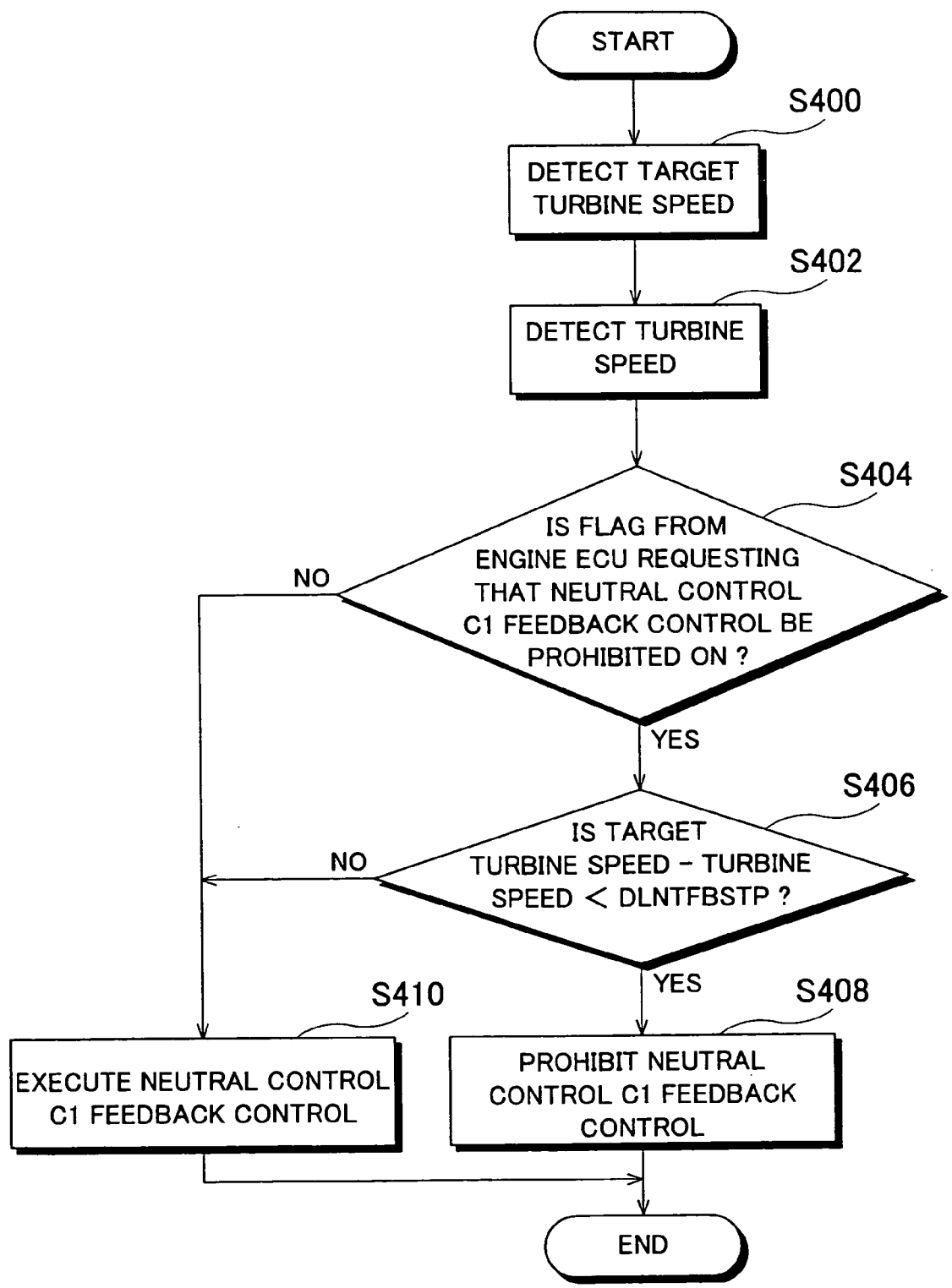
FIG. 9 is a flowchart showing the control structure of a program executed by an ECU according to a fourth exemplary embodiment of the invention.

The control structure of a program executed by the ECT_ECU 1020 according to this exemplary embodiment will be described with reference to FIG. 9. In step S400, the ECT_ECU 1020 detects the target turbine speed. In step S402, the ECT_ECU 1020 detects the turbine speed. In step S404, the ECT_ECU 1020 determines whether a flag from the engine ECU 1010 requesting that the neutral control C1 feedback control be prohibited is on. This determination is made based on the state of the flag input from the engine ECU 1010 to the ECT_ECU 1020. If the flag is on (i.e., YES in step S404), the routine proceeds on to step S406. If not (i.e., NO in step S404), the routine proceeds on to step S410. Just as described above, the neutral control C1 feedback control here refers to feedback control on the apply pressure of the input clutch C1 so that the speed ratio e of the torque converter (=turbine speed NT/engine speed NE) becomes equal to the target speed ratio.

In step S406, the ECT_ECU 1020 determines whether the target turbine speed minus the turbine speed is less than a predetermined threshold value DLNTFBSTP. If the difference between the target turbine speed and the turbine speed is less than this predetermined threshold value DLNTFBSTP (i.e., YES in step S406), the routine proceeds on to step S408.

If not (i.e., NO in step S406), the routine proceeds on to step S410. In step S408, the ECT_ECU 1020 prohibits the neutral control C1 feedback control. In step S410, the ECT_ECU 1020 executes the neutral control C1 feedback control.

Operation of the neutral control in a vehicle equipped with the ECT_ECU 1020, which relates to the control apparatus according to this exemplary embodiment, will now be described based on the foregoing structure and flowchart.

Figure 10A:
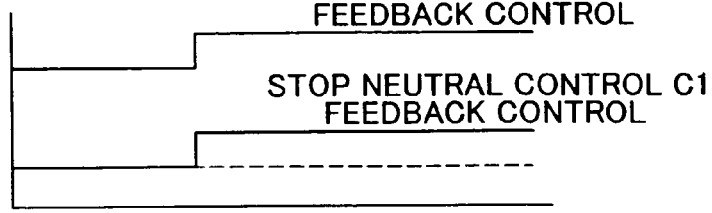
FIGS. 10A, 10B, and 10C are timing charts showing operation of a vehicle equipped with an automatic transmission according to the fourth exemplary embodiment of the invention.
Figure 10B:
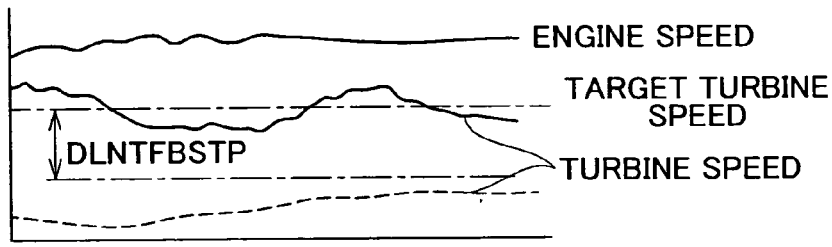
Figure 10C:
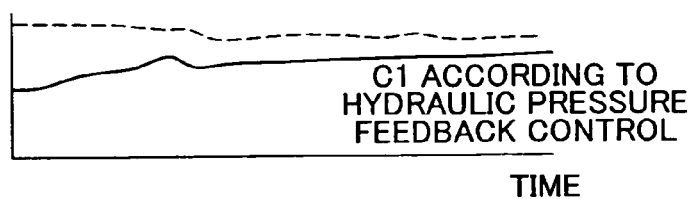

If the flag requesting that the neutral control C1 feedback control be prohibited is on (i.e., YES in step S404), as shown in FIG. 10A, the difference of the target turbine speed minus the turbine speed is compared with the predetermined threshold value DLNTFBSTP (step S406). Of the turbine speeds shown in FIG. 10B, the solid line denotes a case in which the difference is small and the broken line denotes a case in which the difference is large. That is, in FIGS. 10B and 10C, the solid line illustrates a case in which the neutral control C1 feedback control is allowed to be prohibited (i.e., shows a case in which the control is prohibited), and the broken line illustrates a case in which the neutral control C1 feedback control is not allowed to be prohibited (i.e., shows a case in which the control is not prohibited).

If the difference of the target turbine speed minus the turbine speed is large, the flag input from the engine ECU 1010 requesting that the neutral control C1 feedback control be prohibited is ignored and feedback control of the input clutch (C1) 310 during execution of the neutral control is continued.

Figure 11:
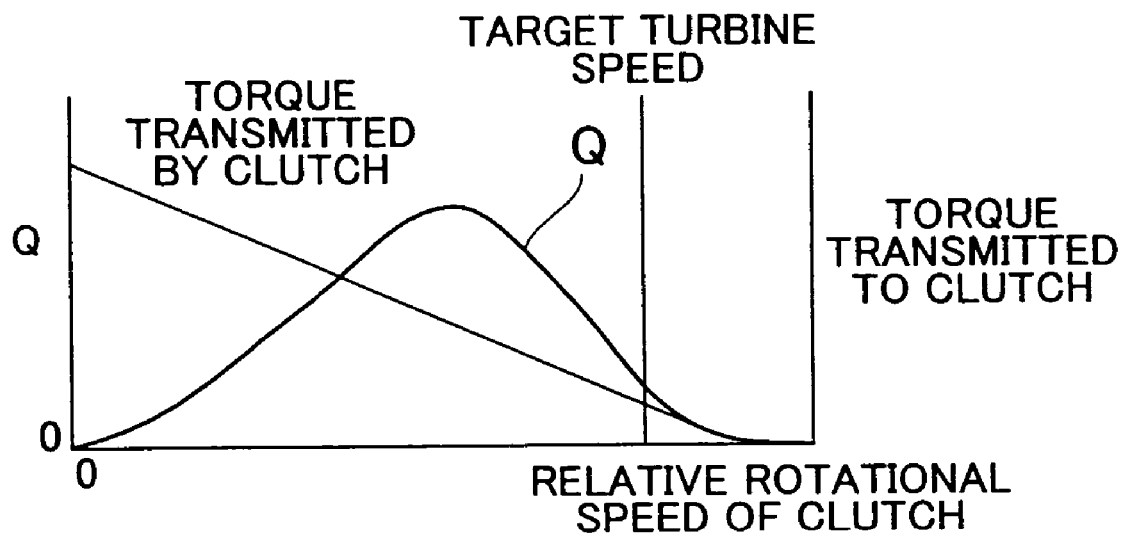
FIG. 11 is a graph showing the clutch energy absorption rate.

In a case in which the turbine speed is less than the target turbine speed, the turbine speed drops when the neutral control is being executed at the target turbine speed. As a result, the clutch energy absorption rate Q changes and the amount of heat generated at the input clutch (C1) 310 increases (the target turbine speed shifts to the left in the drawing and the clutch energy absorption rate Q increases), as shown in FIG. 11. Therefore, even if the flag from the engine ECU 1010 requesting that the feedback control of the input clutch (C1) 310 of the neutral control be prohibited is sent to the ECT_ECU 1020, that flag is ignored and feedback control to the input clutch (C1) 310 during neutral control is continued.

That is, if the feedback control on the apply pressure of the input clutch (C1) 310 is not performed, based on the request from the engine ECU 1010 that the feedback be prohibited, when the difference between the turbine speed and the target turbine speed is large, the turbine speed ends up being maintained while a large amount of heat is being generated at the input clutch (C1) 310. As the amount of heat generated increases, the durability of the apply element decreases. In such a case therefore, the request from the engine ECU 1010 that the feedback control be prohibited is ignored and feedback control of the input clutch (C1) 310 during neutral control is continued.

Accordingly, even if a request to prohibit feedback of the input clutch (C1) 310 has been input from the engine ECU or the like, the ECT_ECU 1020, which relates to the control apparatus according to this exemplary embodiment, ignores that request when the difference between the target turbine speed and the turbine speed is equal to, or greater than, a predetermined threshold value, continues the feedback control of the input clutch (C1) 310 during neutral control, and performs control to reduce the difference between the target turbine speed and the turbine speed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied, the control apparatus comprising:
   a controller that detects a target idle speed of an engine, and determines whether to execute the neutral control based on the target idle speed,
   wherein the controller i) determines that the neutral control can be executed when the target idle speed is lower than a predetermined first threshold value, and ii) determines that the neutral control cannot be executed when the target idle speed is equal to, or greater than, a second threshold value which is higher than the predetermined first threshold value.

2. A control apparatus for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied, the control apparatus comprising:
   a controller that i) detects a target idle speed of an engine, ii) detects a speed of the engine, iii) calculates a difference between the engine speed and the target idle speed, and iv) determines whether to execute the neutral control based on the calculated difference.

3. The control apparatus according to claim 2, wherein the controller i) determines that the neutral control can be executed when the difference is less than a predetermined threshold value, and ii) determines that the neutral control can not be executed when the difference is equal to, or greater than, the predetermined threshold value.

4. A control method for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied, the control method comprising the steps of:
   detecting a target idle speed of an engine;
   determining that the neutral control can be executed when the target idle speed is lower than a predetermined first threshold value; and
   determining that the neutral control cannot be executed when the target idle speed is equal to, or greater than, a second threshold value which is higher than the predetermined first threshold value.

5. A control method for a vehicle equipped with an automatic transmission having an apply element that is applied when the vehicle takes off from a standstill, which executes a neutral control which releases the apply element when the automatic transmission is in a forward-drive range and the vehicle is stopped with a predetermined condition being satisfied, the control method comprising the steps of:
   detecting a target idle speed of an engine;
   detecting a speed of the engine;
   calculating a difference between the engine speed and the target idle speed; and
   determining whether to execute the neutral control based on the calculated difference.

6. The control method according to claim 5, further comprising the step of:
   determining that the neutral control can be executed when the difference is less than a predetermined threshold value, and determining that the neutral control can not be executed when the difference is equal to, or greater than, the predetermined threshold value.

* * * * *